United States Patent [19]

Morishima

[11] Patent Number: 5,195,068
[45] Date of Patent: Mar. 16, 1993

[54] TRACK-NUMBER COMPUTING EQUIPMENT FOR CLV DISK DRIVES

[75] Inventor: Morito Morishima, Hamamatsu, Japan

[73] Assignee: Yamaha Corporation, Hamamatsu, Japan

[21] Appl. No.: 403,827

[22] Filed: Sep. 7, 1989

[30] Foreign Application Priority Data

Sep. 22, 1988 [JP] Japan .............................. 63-238106

[51] Int. Cl.$^5$ ..................... G11B 17/22; G11B 7/00
[52] U.S. Cl. ................................. 369/32; 369/44.28
[58] Field of Search ................... 369/32, 31, 30, 33, 369/44.27, 44.28, 44.31, 44.32, 44.11, 44.12, 40, 41, 43, 54, 55, 56, 57, 58, 50; 360/78.01, 78.04, 78.05, 78.06, 78.07, 78.08, 78.09, 78.11, 78.12, 78.14, 72.01, 72.02

[56] References Cited

U.S. PATENT DOCUMENTS 4,694,441  9/1987  Tomisawa et al. ................... 369/32
4,796,247  1/1989  Volelsang .......................... 360/78.11
4,949,323  8/1990  Yoshima ............................ 369/57

Primary Examiner—Tommy P. Chin
Assistant Examiner—Thai Tran
Attorney, Agent, or Firm—Burns, Doane, Swecker & Mathis

[57] ABSTRACT

Track-number computing equipment for CLV disc drives used for positioning a pick-up on a target track. This equipment reads time data written on a disc, and computes the number of tracks from a reference track to the target track by using the time data. The time data is separated into high-order time data whose interval, for example, is 10 minutes, and low-order time data. Each high-order time data is associated with a pair of an offset value and a coefficient which are stored in a memory. Each offset value represents the track number corresponding to the high-order time data and each coefficient represents the rate at which the track number increases with the increase of the low-order time data. In computing the track number to the target track, the equipment reads the time data from the disc, splits it into the high-order and low-order time data, reads the offset-value and the coefficient corresponding to the high-order time data from the memory and computes the linear equation specified by the offset value and coefficient. This linear equation approximates the relationship between the low-order time data and the track number. The equipment finally obtains the track number to the target track by applying the low-order time data to the linear equation. Thus, the track number corresponding to the time data can be easily computed using the linear equation, which shortens the time required for computation.

11 Claims, 3 Drawing Sheets

| PIECE NO. | INDEX | TIME DATA | | | 26 27 | ABSOLUTE TIME DATA | | |
|---|---|---|---|---|---|---|---|---|
| | | MIN | SEC | FRAME | | MIN | SEC | FRAME |
| | | ⋮ | ⋮ | ⋮ | | STARTING TIME OF THE FIRST PIECE STARTING TIME OF THE SECOND PIECE ⋮ | | |
| | A0 | | | | | STARTING TIME OF THE FIRST PIECE | | |
| | A1 | | | | | STARTING TIME OF THE LAST TRACK | | |
| | A2 | | | | | ABSOLUTE STARTING TIME OF THE READ-OUT TRACK | | |

FIG. 3

TRACK-NUMBER COMPUTING EQUIPMENT FOR CLV DISK DRIVES

BACKGROUND OF THE INVENTION

1. Field of the Invention

The present invention relates to track-number computing equipment for CLV (Constant Linear Velocity) disc drives. This equipment computes the number of tracks between a reference track and a target track in which a desired piece of music or data is recorded when a random access operation is carried out.

2. Prior Art

Digital discs, such as CDs (Compact Discs), use CLV in order to reduce the size of the discs. CLV is an acronym for "Constant Linear Velocity", in which the rotating rate of a disc varies according to the radial position of the pick-up so that a constant linear velocity is achieved. In CLV, a random access operation, such as searching the top of a desired piece of music, is performed by computing the radial displacement of a pick-up from a current position to a target position by using a microprocessor.

FIG. 1 is a diagrammatical view of the data format in which data are recorded on a CD.

As is well known, the data stream is split up into and recorded in frames. A frame consists of frame-synchronization pattern 1, subcode 2, data words 3, and parity words 4. Frame-synchronization pattern 1 is used to identify the top position of each frame, data words 3 are two channel data L and R (left and right) formed by sampling original signals at a sampling rate of 44.1 kHz, and parity words are used for detecting and correcting errors.

Subcode 2, having 8 bits for each frame, consists of 98 eight-bit symbols from 98 frames which constitute 1 block. Each bit of the eight-bit subcoding symbol of one frame corresponds to 8 channels P to W, and so each channel P to W consists of 98 bits. Channel P indicates the beginning of a piece of music by maintaining at least two seconds of "1" level at the beginning, and maintaining "0" level afterwards. Channel Q has three modes: in Mode 1, channel Q records time data, and other data; in Mode 2 and 3, channel Q records a catalogue number of the disc. Channels R to W are not utilized at present.

FIG. 2 is a diagrammatical view of the channel Q in Mode 1. Numeral 10 in FIG. 2 designates piece-number data of 8 bits for indicating the number of the piece. Numeral 11 designates index data of 8 bits, numeral 15 designates time data of 24 bits for indicating the elapsed time from the beginning of the piece. Time data 15 consists of 3 types of eight-bit data: minute data 12 indicating minutes, second data 13 indicating seconds, and frame-number data 14 indicating the number of frames (one second contains 75 frames). Next to time data 15, there are 8 consecutive "0" bits, and absolute time data 19 indicating the total elapsed time from the top of the musical area of the disc. Absolute time data 19 is composed in a manner similar to time data 15, that is, time data 19 consists of minute data 16, second data 17, and frame-number data 18 that indicate the total elapsed time. Thus, the data of channel Q consist of 72 bits, and each piece of data therein is stored in the form of 2 digit BCD (Binary Coded Decimal).

The disc has a lead-in area inside the musical tracks, i.e., at the innermost part of the disc. FIG. 3 shows the format of a table of contents (TOC) provided in the lead-in area. The table of contents records the duration and start time of each piece recorded on the disc as in channel Q described above.

The conventional CD player performs a random access operation as follows by using the data described above:

When the number of a target piece of music is entered by manipulating the operation button, this number is converted into the target position data and is stored into a memory in the CD player. The C player recognizes the current position of the pick-up by reading absolute time data 19 of channel Q. This is achieved by rotating the disc for a certain distance. Then, the CD player compares the current position and the target position to compute the radial distance therebetween by means of a microprocessor, and moves the pick-up to the target position. When the pick-up seems to reach the target position, the CD player reads absolute time data 19 of channel Q again, compares the read data with the target data, and moves the pick-up by a computed distance, thus positioning the pick-up at the target position. The CD player, as described above, repeats the operations of reading absolute time data 19 of channel Q, computing the difference between the current position and the target position, and moving and positioning the pick-up on the target position.

Thus, the positioning of the pick-up is achieved. However, since the data of channel Q are split up into 98 different frames, the CD player must read at least 98 frames to obtain the channel Q data, which takes a considerable length of time. To shorten the time required to reach the target position, the following method is adopted:

First, absolute time data 29 indicating the starting time of a target piece is read from the table of contents shown in FIG. 3. The CD player, using the read time data, computes the distance between the target position and the starting track (i.e., innermost track) of the musical area by using the microprocessor, and moves the pick-up by the distance obtained. In this case, fine adjustment of the positioning of the pick-up is required at the final stage of the positioning, because of the very narrow track pitch of about 1.6 μm.

In this method, the target position of the pick-up is computed as a radial distance from the starting track of the musical area by using the absolute time data. However, the distance cannot be rapidly calculated to a high degree of accuracy in a short time, because the microprocessor is not powerful enough t achieve the high speed computation. As a result, a considerable length of time is required for the pick-up to reach the target position.

SUMMARY OF THE INVENTION

It is therefore an object of the present invention to provide track-number computing equipment for CLV disc drives that can compute the number of tracks from the starting track of the musical area to a target position in a short time with high accuracy.

In one aspect of the present invention, there is provided track-number computing equipment for CLV disc drives used for positioning a pick-up on a target track of a disc, the track-number computing equipment reading time data written on the disc to indicate the position of a set of data recorded on the disc, and computing the number of tracks from a reference track to the target track by using the time data, the track-number computing equipment for CLV disc drives comprising:

separating means for splitting the time data read from the disc into high-order time data and low-order time data, storing means for storing coefficients and offset values of line segments which indicate the relationship between the time data and the number of tracks corresponding to the time data, and producing the coefficient and offset value when the high-order time data is applied to the address input thereof; and computing means for computing the number of tracks to the target track by using the low-order time data and the line segment specified by the coefficient and offset value produced from the storing means.

BRIEF DESCRIPTION OF THE DRAWINGS

FIG. 3 is a diagrammatical view of the table of contents located in the lead-in area at the innermost part of a disc;

DESCRIPTION OF THE PREFERRED EMBODIMENT

The invention will now be described with reference to the accompanying drawings.

Figure 1:
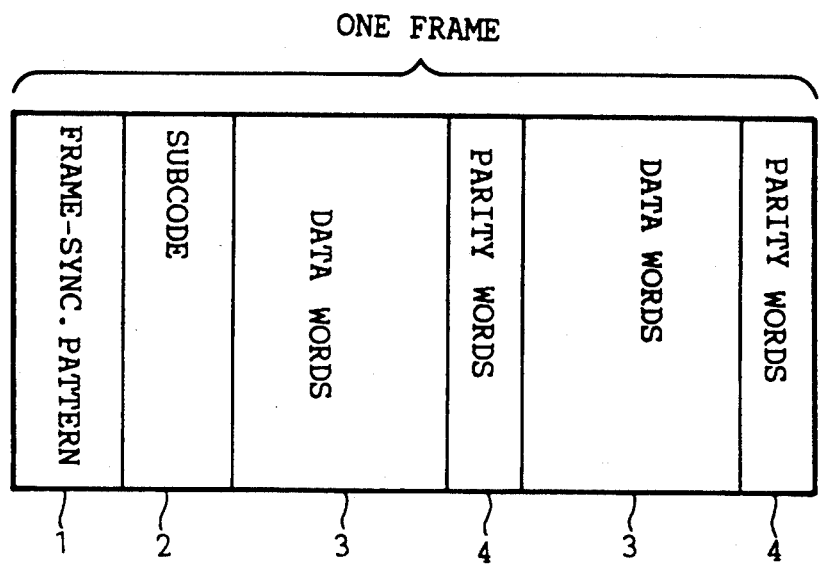
FIG. 1 is a diagrammatical view of a frame format on CD.
Figure 2:
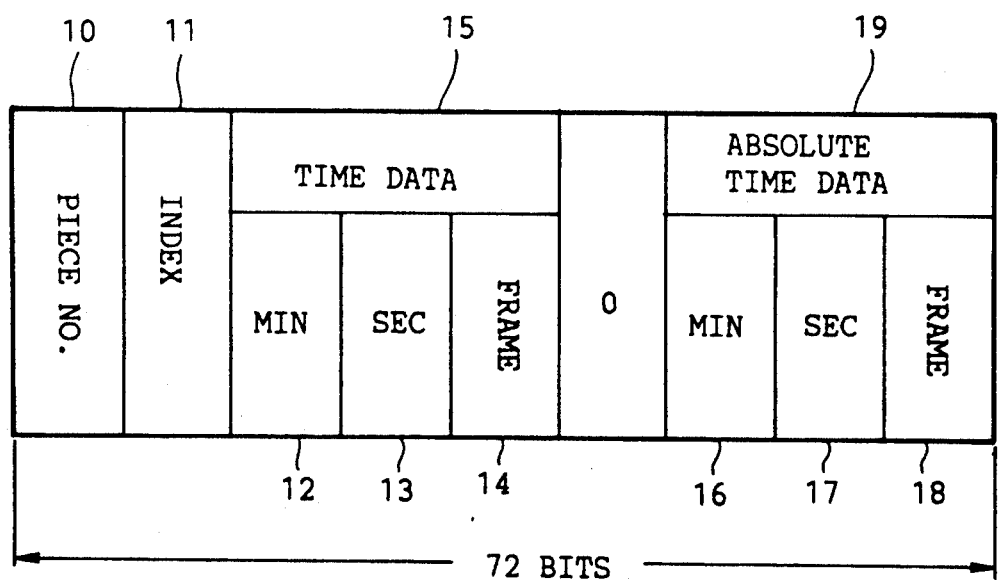
FIG. 2 is a diagrammatical view of channel Q.
Figure 4:
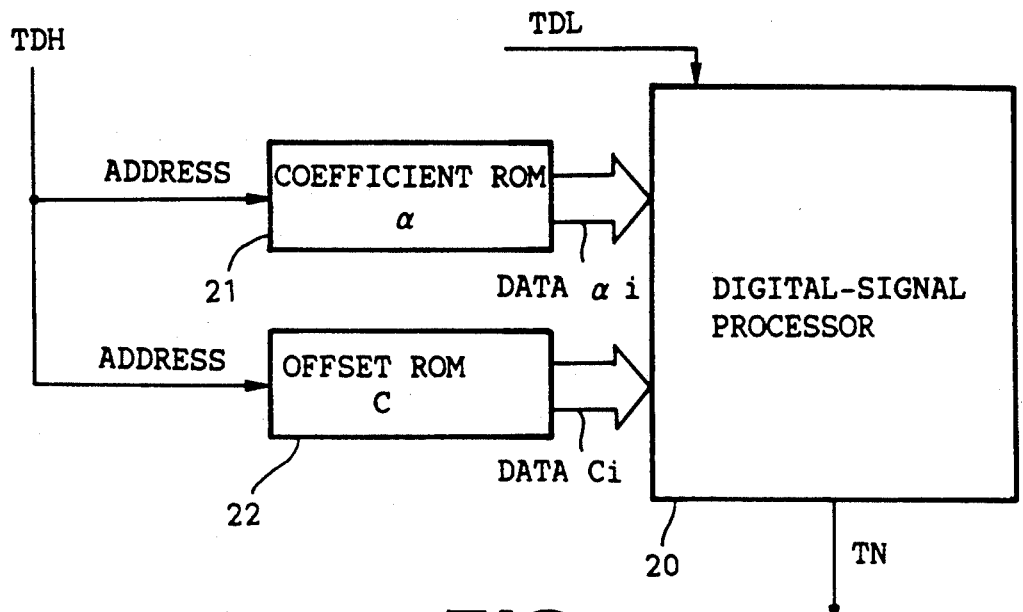
FIG. 4 is a block diagram showing a configuration of an embodiment of the present invention.

FIG. 4 is a block diagram showing a configuration of an embodiment of the present invention.

In FIG. 4, absolute time data 29 read by the pick-up from the table of contents shown in FIG. 3 is separated into two parts: high-order time data TDH and low-order time data TDL. High-order time data TDH consists of a BCD code composed of the upper 4 bits of minute data 26. On the other hand, low-order time data TDL consists of BCD codes composed of the lower 4 bits of minute data 26, second data 27 and frame-number data 28. High-order time data TDH is supplied to the address buses of coefficient ROM 21 and offset ROM 22, and low-order time data TDL is supplied to digital-signal processor 20. Coefficient ROM 21 stores coefficients $\alpha$ and offset ROM 22 stores offset values C.

Figure 5:
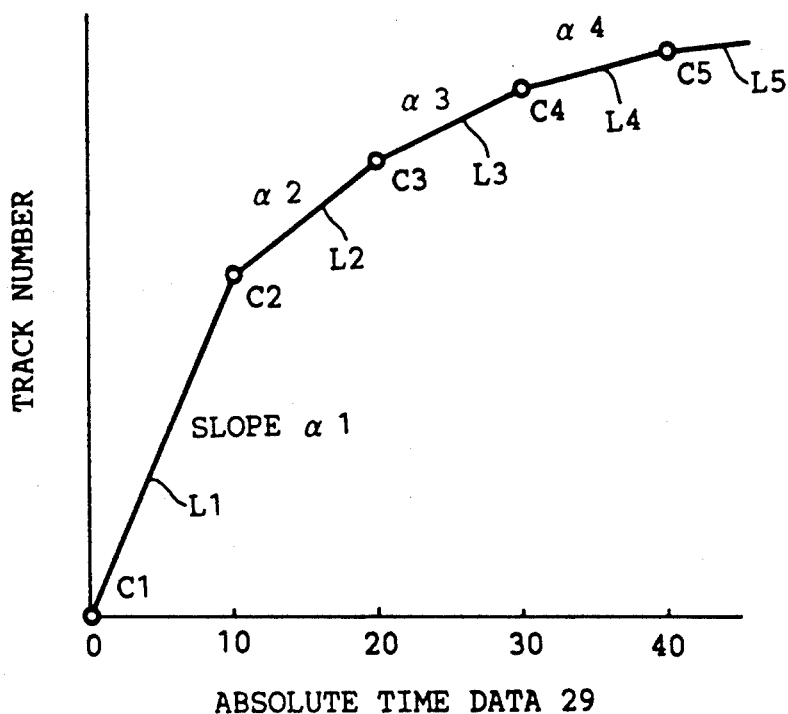
FIG. 5 is a diagrammatical view to explain the contents of ROMs 21 and 22.

FIG. 5 shows the relationship between coefficients $\alpha$ and offset values C, and absolute time data 29. Each pair of coefficient $\alpha i$ and offset value Ci (i=1, 2, ... 5) defines a line segment Li whose starting point is located at (10(i−1), Ci) and whose slope is $\alpha i$. Here, the value 10(i−1) (i.e., 0, 10, 20, 30, 40 minutes) corresponds to high-order time data TDH. As a result, equations that define the line segments can be obtained from high-order time data TDH, offset values Ci and coefficients $\alpha i$. Thus, the line composed of the line segments Li each of which has offset value Ci and slope $\alpha i$ indicates the relationship between the absolute time data 29 (i.e., the total elapsed time from the starting track of the musical area) and the number of tracks TN from the starting track. In other words, this line represents, in a linear approximation, the relationship between the absolute time data 29 and the number of tracks from a reference track (i.e., the starting track) to the track indicated by the time data. Thus, the stored data in coefficient ROM 21 and offset ROM 22 are used to interpolate and obtain the relationship between the absolute time data 29 and the number of tracks TN.

Digital-signal processor 20 computes the number of tracks TN corresponding to absolute time data 29 by using the line segment Li and low-order time data TDL. This is performed by applying low-order time data TDL to the line segment Li specified by high-order time data TDH corresponding to the lower-time data TDL. For example, if absolute time data 29 is 23 minutes 45 seconds, high-order time data TDH is 2, and low-order time data TDL is 3 minutes 45 seconds. As a result, coefficient C3 and offset value C3 are produced from coefficient ROM 21 and offset ROM 22, respectively. Digital-signal processor 20 computes the equation of line segment L3 corresponding to 20 minutes specified by offset value C3 and coefficient $\alpha 3$, and then computes the number of tracks by putting the low-order time data TDL (3 minutes 45 seconds in this case) into the equation. The resulting data is produced a track-number data TN.

Operation of the embodiment is as follows:

First, the target number of a piece of music is entered from the operation button, and is stored in the memory of the CD player. Subsequently, absolute time data 29, corresponding to the target number, is read by the pick-up from the table of contents in the lead-in area of the disc, and is separated into high-order time data TDH and low-order time data TDL, which are supplied to the address terminal of coefficient ROM 21 and offset ROM 22. Thus, the addresses of ROMs 21 and 22 are designated. As a result, coefficient ROM 21 and offset ROM 22 produce coefficients $\alpha i$ and offset value Ci corresponding to high-order time data TDH, respectively, and these data are supplied to digital-signal processor 20 through the data buses. On the other hand, low-order time data TDL is directly supplied to digital-signal processor 20. Digital-signal processor 20 computes the number of tracks TN by using the line segment specified by coefficient ci and offset value Ci, and low-order time data TDL.

For example, suppose that absolute time data 29 read by the pick-up is 14 minutes 35 seconds. In this case, high-order time data TDH is 1 (10 minutes), and low-order time data TDL is 4 minutes 35 seconds. As a result, the coefficient of $\alpha 2$ and offset value of C2 (see FIG. 5) are supplied to digital-signal processor 20. Digital-signal processor 20 computes the equation of line segment L2 specified by $\alpha 2$ and C2, and applies low-order time data TDL (4 minutes 35 seconds) to the equation so that the number of tracks TN corresponding to time data TDL will be obtained.

The number of tracks TN thus obtained is sent to a system-control circuit of the CD player which controls the whole circuits and mechanisms of the CD player. The system-control circuit controls pick-up-servo mechanism and disc-motor-servo mechanism according to the number of tracks TN, and moves the pick-up to the target track.

According to the embodiment described above, the computation of the number of tracks TN is easily achieved, because the computation is carried out by using a linear equation. Consequently, the quick and accurate computation of the number of tracks is achieved.

Although a specific embodiment of track-number computing equipment for CLV disc drives constructed in accordance with the present invention has been disclosed, it is not intended that the invention be restricted to either the specific configuration or the uses disclosed herein. Modifications may be made in a manner obvious to those skilled in the art. Accordingly, it is intended that the invention be limited only by the scope of the appended claims.

What is claimed is:

1. A disc drive for positioning a pick-up on a target track of a disc, said disc drive having track-number computing equipment for reading time data written on the disc to indicate a position of a set of data recorded on the disc, and determining a number of tracks from a reference track to said target track by using said time data, said disc drive comprising:

storing means for storing a converting function which indicates a relationship between said time data and a number of tracks corresponding to the time data, said converting functioning being a continuous function which begins from a start point and which includes a plurality of line segments each of which is defined by an initial value and linear slope data;

separating means for splitting said time data read from the disc into high-order time data and low-order time data, said high-order time data corresponding to a first predetermined time period and said low-order time data corresponding to a difference between said first predetermined time period and a second time period corresponding to said time data, said high-order time data being applied to an address input of said storing means for producing an initial value and linear slope data corresponding to said applied high-order time data; and computing means for controlling movement of said pick-up to said target track in response to the number of tracks from said reference track to said target track by computing the number of tracks from said reference track to said target tracked using said low-order time data and a line segment identified by said initial value and said linear slope data produced from said storing means.

2. A disc drive according to claim 1, wherein said separating means splits said time data into 4 upper bits and remaining bits, and produces said upper 4 bits as said high-order time data, and said remaining bits as said low-order time data.

3. A disc drive according to claim 1, wherein said time data is absolute time data recorded in a table of contents of said disc.

4. A disc drive according to claim 1, wherein said reference track is a first trace in a musical area of said disc.

5. A disc drive according to claim 1, wherein said storing means includes a ROM storing coefficients and a ROM storing offset data, said coefficient and said offset data representing said linear slope data and said initial values respectively, which constitute said plurality of linear segments.

6. A disc drive according to claim 5, wherein said computing means computes the number of tracks using a linear equation specified by a selected offset value and a coefficient produced from said storing means, said offset value representing a track number corresponding to said high-order time-data applied to said storing means, and said coefficient representing a rate at which the track number increases with an increase of said low-order time data when paired with said high-order time data, and wherein said computing means provides pick-up control information by applying said low-order time data to said linear equation.

7. A disc drive device for positioning a pick-up on a target track of a disc, said disc drive device comprising:

an input for receiving time data from a disc pick-up;

a memory for storing parameters which define a plurality of linear segments, said linear segments collectively approximating a relationship between the time data associated with a target track recorded on the disc and a number of tracks from a reference track to the target track;

an address terminal for selected stored parameters from said memory which define one so said plurality of linear segments in response to a first portion of said time data; and a processor for receiving said selected stored parameters from said memory and for receiving a second portion of said time data to control movement of said pick-up to said target track in response to a selected number of tracks from said reference track to said target track said processor computing the selected number of tracks from said reference track to said target track by applying said second portion of said time data to a linear segment defined by said selected stored parameters.

8. Disc drive according to claim 7, wherein said memory further includes:

a first ROM for storing a starting point for each of said plurality of linear segments; and a second ROM for storing a slope for each of said plurality of linear segments.

9. Disk drive according to claim 8, wherein the address terminal further includes:

addresses buses for inputting said first portion of said time data to said first and second ROMs, said first portion being a four-bit code representing minute data in ten-minute intervals.

10. Disk drive according to claim 9, wherein said time data is recorded on a constant linear velocity digital disc.

11. Method for positioning a pick-up on a target track of a disc, comprising the steps of:

reading time data from the disc;

storing parameters which define a plurality of linear segments, said linear segments collectively approximating a relationship between time data associated with a target track recorded on the disc and a number of tracks from a reference track to the target track;

selecting stored parameters which define one of said plurality of linear segments in response to a first portion of said time data; and positioning said pick-up in response to computing a selected number of tracks from said reference track to said target track by applying said second portion of said time data to a linear segment defined by said selected stored parameters.

* * * * *